(12) United States Patent
Hoover et al.

(10) Patent No.: US 9,151,887 B2
(45) Date of Patent: Oct. 6, 2015

(54) MULTI-CORE OPTICAL FIBERS WITH SINGLE MODE AND MULTIMODE CORE ELEMENTS

(71) Applicant: Corning Incorporated, Corning, NY (US)

(72) Inventors: Brett Jason Hoover, Middlebury Center, PA (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 160 days.

(21) Appl. No.: 14/017,362

(22) Filed: Sep. 4, 2013

(65) Prior Publication Data

US 2014/0064687 A1     Mar. 6, 2014

Related U.S. Application Data

(60) Provisional application No. 61/696,495, filed on Sep. 4, 2012.

(51) Int. Cl.
*G02B 6/036* (2006.01)
*G02B 6/02* (2006.01)
*G02B 6/028* (2006.01)

(52) U.S. Cl.
CPC ........ *G02B 6/02042* (2013.01); *G02B 6/03644* (2013.01); *G02B 6/0281* (2013.01); *G02B 6/0365* (2013.01)

(58) Field of Classification Search
CPC ............... G02B 6/02042; G02B 6/03644
USPC .................................................. 385/126
See application file for complete search history.

(56) References Cited

U.S. PATENT DOCUMENTS

| | | | |
|---|---|---|---|
| 2010/0189400 A1* | 7/2010 | Sillard et al. | 385/127 |
| 2011/0222828 A1* | 9/2011 | Sasaoka et al. | 385/127 |
| 2012/0114292 A1 | 5/2012 | Hoover et al. | |
| 2012/0183304 A1* | 7/2012 | Winzer et al. | 398/142 |
| 2014/0199039 A1* | 7/2014 | Kokubun et al. | 385/126 |

* cited by examiner

*Primary Examiner* — Jerry Blevins
(74) *Attorney, Agent, or Firm* — Robert L. Carlson

(57) ABSTRACT

Multi-core optical fibers are disclosed herein. According to one embodiment, a multi-core optical fiber includes a common outer cladding formed from silica-based glass and having a cladding index of refraction $n_{cl}$. At least one single mode core element may be disposed in the common outer cladding. The at least one single mode core element may have a maximum index of refraction $n_{1\ sm}$. In addition, at least one multimode core element may be disposed in the common outer cladding, the at least one multimode core element having a maximum index of refraction $n_{1\ mm}$. The maximum refractive index $n_{1\ sm}$ of the at least one single mode core element may be greater than the cladding index of refraction $n_{cl}$, the maximum refractive index $n_{1\ mm}$ of the at least one multi-mode core element may be greater than $n_{cl}$, and a center-to-center spacing between adjacent core elements is greater than or equal to 25 μm.

20 Claims, 5 Drawing Sheets

MULTI-CORE OPTICAL FIBERS WITH SINGLE MODE AND MULTIMODE CORE ELEMENTS

CROSS-REFERENCE TO RELATED APPLICATIONS

This application claims the benefit of priority under 35 U.S.C. §119 of U.S. Provisional Application Ser. No. 61/696,495, filed on Sep. 4, 2012, the content of which is relied upon and incorporated herein by reference in its entirety.

BACKGROUND

1. Field

The present specification generally relates to optical fibers and, more specifically, to optical fibers which include a plurality of single mode core elements and a plurality of multimode core elements.

2. Technical Background

In recent years optical fiber has become accepted as a viable alternative to traditional materials used for data signal communication. Optical fiber is now widely utilized in a variety of electronic devices to facilitate the high-speed communication of data signals at high bandwidths. However, as the speed and bandwidth of the electronic components in data communication devices increases, there is a corresponding need to increase the speed of optical interconnects which couple such devices. One solution to increase the speed of optical interconnects is to increase the fiber density of the optical interconnects and thereby realize high fiber count connectors. However, increasing the number of individual fibers in an optical interconnect adds to the overall size of the optical interconnect.

SUMMARY

According to one embodiment, a multi-core optical fiber includes a common outer cladding formed from silica-based glass and having a cladding index of refraction $n_{cl}$. At least one single mode core element formed from silica-based glass may be disposed in the common outer cladding. The at least one single mode core element may have a maximum index of refraction $n_{1\ sm}$. In addition, at least one multimode core element formed from silica-based glass may be disposed in the common outer cladding, the at least one multimode core element having a maximum index of refraction $n_{1\ mm}$. The maximum refractive index $n_{1\ sm}$ of the at least one single mode core element may be greater than the cladding index of refraction $n_{cl}$, the maximum refractive index $n_{1\ mm}$ of the at least one multi-mode core element may be greater than $n_{cl}$, and a center-to-center spacing between adjacent core elements may be greater than or equal to 25 µm.

According to another embodiment, a multi-core optical fiber may include a common outer cladding formed from silica-based glass. A plurality of single mode core elements formed from silica-based glass may be disposed in the common outer cladding. Individual ones of the plurality of single mode core elements may have a relative refractive index $\Delta_{1\ sm}$ greater than or equal to 0.2% relative to the common outer cladding. In addition, a plurality of multimode core elements formed from silica-based glass may be disposed in the common outer cladding. Individual ones of the plurality of multimode core elements may have a relative refractive index $\Delta_{1\ mm}$ greater than or equal to 0.2% relative to the common outer cladding. A center-to-center spacing between adjacent core elements may be greater than or equal to 25 µm.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
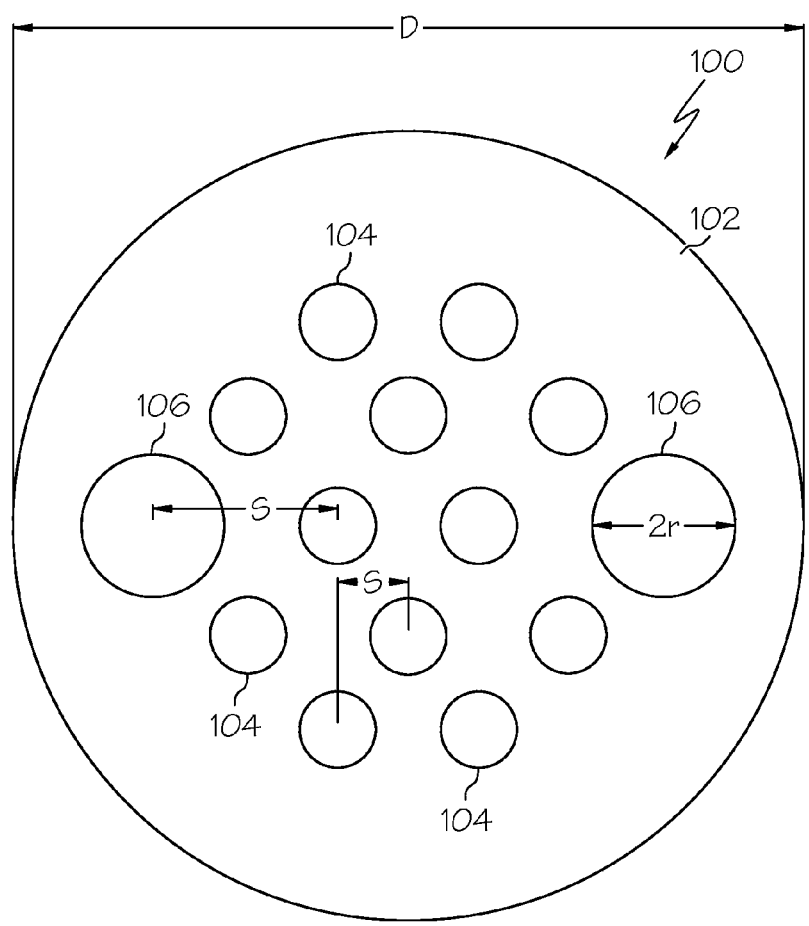
FIG. 1 schematically depicts one embodiment of a multi-core optical fiber according to one or more embodiments shown and described herein.

Reference will now be made in detail to various embodiments of multi-core optical fibers, examples of which are illustrated in the accompanying drawings. Whenever possible, the same reference numerals will be used throughout the drawings to refer to the same or like parts. One embodiment of a multi-core optical fiber is schematically depicted in FIG. 1. The multi-core optical fiber generally comprises a common outer cladding formed from silica-based glass and having a cladding index of refraction $n_{cl}$. At least one single mode core element and at least one multimode core element are disposed in the common outer cladding. The single mode core element and the multimode core element are formed from silica-based glass. The single mode core element has a relative refractive index $\Delta_{1\ sm}$ greater than or equal to 0.2% relative to the common outer cladding. The multimode core element has a relative refractive index $\Delta_{1\ mm}$ greater than or equal to 0.2% relative to the common outer cladding. A center-to-center spacing between adjacent core elements is greater than or equal to 25 µm. Various embodiments of multi-core optical fibers and methods for forming the same will be described in more detail herein with specific reference to the appended drawings.

The phrase "refractive index profile," as used herein, refers to the relationship between refractive index or relative refractive index and the dimensions of the optical fiber.

The phrase "relative refractive index," as used herein, is defined as $\Delta(r) \% = 100 \times (n(r)^2 - n_{REF}^2)/2n_i^2$, where $n_i$ is an extreme of the refractive index in region i (i.e., the minimum or maximum of the refractive index in region i), unless otherwise specified. The relative refractive index percent is measured at 1550 nm unless otherwise specified. The term $n_{REF}$ is the average refractive index of the common outer cladding, which can be calculated, for example, by taking "N" index measurements ($n_{c1}, n_{c2}, \ldots n_{cN}$) of the common outer cladding (which, in some embodiments, may be undoped silica), and calculating the average refractive index by:

$$n_C = (1/N) \sum_{i=1}^{i=N} n_{Ci}$$

As used herein, the relative refractive index is represented by $\Delta$ and its values are given in units of "%," unless otherwise specified. In cases where the refractive index of a region is less than the reference index $n_{REF}$, the relative refractive index is negative and is referred to as having a depressed region or depressed-index, and the minimum relative refractive index is calculated at the point at which the relative refractive index is most negative, unless otherwise specified. In cases where the refractive index of a region is greater than the reference index $n_{REF}$, the relative index percent is positive and the region can be said to be raised or to have a positive index.

The term "α-profile" or "alpha profile" refers to a relative refractive index profile of the core members, expressed in terms of $\Delta(r)$ which is in units of "%", where r is the radius of the core member and which follows the equation:

$$\Delta(r)\% = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero with respect to the common outer cladding, and r is in the range $r_i \leq r \leq r_f$, where $\Delta$ is defined as above, $r_i$ is the initial point of the α-profile, $r_f$ is the final point of the α-profile, and α is an exponent which is a real number. For a profile segment beginning at the centerline of a core member (i.e., r=0), the α-profile has the simpler form $$\Delta(r)\% = \Delta(0)(1 - [|r|/(r_1)]^\alpha),$$

where $\Delta(0)$ is the refractive index delta at the centerline of the core member.

Mode field diameter (MFD) is a measure of the spot size or beam width of light propagating in a single mode fiber. Mode-field diameter is function of the source wavelength, fiber core radius and fiber refractive index profile. MFD is measured using the Peterman II method where $$MFD = 2w,$$

and $$w^2 = 2 \frac{\int_0^\infty E^2 r dr}{\int_0^\infty (dE/dr)^2 r dr}$$

where E is the electric field distribution in the fiber and r is the radius of the fiber.

The effective area of a fiber is the area of the fiber in which light is propagated and is defined as:

$$A_{eff} = 2\pi \frac{\left(\int_0^\infty E^2 r dr\right)^2}{\int_0^\infty E^4 r dr},$$

where E is the electric field associated with light propagated in the fiber and r is the radius of the fiber.

The cutoff wavelength is the minimum wavelength at which an optical fiber will support only one propagating mode. If the operative wavelength is below the cutoff wavelength, multimode operation may take place and the introduction of additional sources of dispersion may limit a fiber's information carrying capacity. A mathematical definition can be found in Single Mode Fiber Optics, Jeunhomme, pp. 39 44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The cutoff wavelength may be measured using a transmitted power technique such as the technique described in TIA-455-80B entitled "Measurement Cut-off Wavelength of Uncabled Single-mode Fiber By Transmitted Power."

All wavelength-dependent optical properties (such as cut-off wavelength, etc.) are reported herein for the wavelength specified.

The cross-talk between cores of a multi-core optical fiber ribbon may be determined utilizing the following equations. The powers transmitted in two adjacent core members may be calculated as:

$$P_1 = \cos^2(gz) + \left(\frac{\Delta\beta}{2g}\right)^2 \sin^2(gz),$$

and $$P_2 \left(\frac{\kappa}{g}\right)^2 \sin^2(gz),$$

where z is the length of the fiber, κ is the coupling coefficient, $\Delta\beta$ is the mismatch propagation constant between the modes propagating in the adjacent core members when they are insulated from one another, and g is a parameter depending on κ and $\Delta\beta$ such that $$g^2 = \kappa^2 + \left(\frac{\Delta\beta}{2}\right)^2.$$

The cross-talk can be calculated based on the power transmitted through the adjacent core members utilizing the following relationship:

$$X = 10 \log\left(\frac{P_2}{P_1}\right) = 10 \log\left(\frac{4\kappa^2}{4g^2 c\tan(gz) + (\Delta\beta)^2}\right).$$

The terms "multimode" and "multimoded," as used herein, refer to a core element which supports the propagation of multiple modes of light at the specified wavelength(s).

The term "few moded" refers to a multimode core element which supports the propagation of greater than 1 mode of light and less than or equal to 25 modes of light at the specified wavelength(s).

Referring now to FIG. 1, a cross section of one embodiment of a multi-core optical fiber 100 is schematically depicted. The multi-core optical fiber 100 generally comprises at least one single mode core element 104 and at least one multimode core element 106. For example, in one embodiment, the multi-core optical fiber 100 comprises a plurality of single mode core elements 104 and a plurality of multimode core elements 106 which are disposed in a common outer cladding 102. In another embodiment, the multi-core optical fiber 100 comprises at least one single mode core element 104 and a plurality of multimode core elements 106 which are disposed in a common outer cladding 102. In yet another embodiment, the multi-core optical fiber 100 comprises a plurality of single mode core elements 104 and at least one multimode core element 106, all of which are disposed in a common outer cladding 102. The single mode core elements 104 and the multimode core elements 106 are oriented in the common outer cladding 102 such that the long axis of each core element 104, 106 are generally parallel. In some embodiments, the plurality of multimode core elements 106 may be few moded.

In the embodiments described herein, the single mode core elements 104 and the multimode core elements 106 are spaced apart from one another such that the cross-talk between adjacent core elements is minimized. In some embodiments, the cross-talk between adjacent core elements is less than −30 dB, preferably less than −35 dB, and even more preferably less than −40 dB. The desired level of cross-talk between adjacent core elements is obtained by spacing the core elements apart from one another by a minimum spacing S, as measured from the center of one core element to the center of an adjacent core element. In the embodiments described herein, the spacing S between adjacent core elements is generally greater than or equal to about 25 μm, preferably greater than or equal to about 30 μm, more preferably greater than or equal to about 40 μm. In some embodiments, the spacing S between adjacent core elements is uniform throughout the multi-core optical fiber (i.e., the spacing S between adjacent core elements is the same). In other embodiments, the spacing between adjacent core elements may be non-uniform amongst the core elements, so long as the spacing is greater than or equal to the minimum spacing S.

Still referring to FIG. 1, the common cladding layer 102 is formed from silica-based glass ($SiO_2$) with an index of refraction $n_{cl}$. The index of refraction $n_{cl}$ of the common outer cladding is generally less than the index of refraction $n_{1\,sm}$ of the single mode core elements 104 and the index of refraction $n_{1\,mm}$ of the multimode core elements 106 (i.e., $n_{cl} < n_{1\,sm}$ and $n_{cl} < n_{1\,mm}$). In some embodiments the common outer cladding 102 is substantially free from dopants or contaminants which would alter the index of refraction of the common outer cladding 102 including, without limitation, up-dopants (i.e., germanium and the like) and down-dopants (i.e., boron, fluorine and the like). The term "substantially free," as used herein, means that the common outer cladding 102 does not contain any constituent components intentionally added to the glass of the common cladding layer 102 but may contain impurities or "tramp" contaminants in an amount less than or equal to about 0.1 wt. %. In other embodiments, the common outer cladding 102 may comprise one or more up-dopants which increase the refractive index of the silica glass, or one or more down-dopants which decreases the refractive index of the silica glass, so long as the index of refraction $n_{cl}$ of the common outer cladding is less than the index of refraction of the single mode core elements 104 and the index of refraction of the multimode core elements 106.

The single mode core elements 104 are generally formed from silica-based glass and have an index of refraction $n_{1\,sm}$ and a relative refractive index $\Delta_{1\,sm}$ relative to the common outer cladding 102. In the embodiments described herein, the silica-based glass of the single mode core elements 104 is doped with one or more dopants which increases the index of refraction of the single mode core elements 104. For example, the single mode core elements 104 may comprise silica-based glass doped with germanium such as when the single mode core elements 104 comprise silica ($SiO_2$) glass up-doped with germania ($GeO_2$). However, it should be understood that dopants other than germania may be utilized in the core elements, including, without limitation, $TiO_2$, $ZrO_2$, $Nb_2O_5$ and/or $Ta_2O_5$. Such dopants may be incorporated in the single mode core elements 104 either individually or in combination in order to obtain the desired index of refraction $n_{1\,sm}$ and relative refractive index $\Delta_{1\,sm}$. In some embodiments, the single mode core elements 104 may comprise from about 3.2 wt. % to about 40 wt. % $GeO_2$. For example, in some embodiments, the single mode core elements 104 comprise from about 5.0 wt. % to about 16 wt. % $GeO_2$, more preferably from about 5.5 wt. % to about 10.0 wt. % $GeO_2$, and, most preferably, from about 5.5 wt. % to about 8.0 wt. % $GeO_2$, which increases the index of refraction $n_{1\,sm}$ of the single mode core elements 104 relative to undoped silica glass. In the embodiments described herein, the relative refractive index $\Delta_{1\,sm}$ of the single mode core elements 104 relative to the common outer cladding 102 is greater than or equal to 0.2%. For example, in some embodiments, the relative refractive index $\Delta_{1\,sm}$ of the single mode core elements 104 relative to the common outer cladding 102 is greater than or equal to about 0.2% and less than or equal to about 0.5%, preferably greater than or equal to about 0.3% and less than or equal to about 0.4%.

In some embodiments described herein, the single mode core elements may have a cutoff wavelength that is less than or equal to about 1500 nm. In some other embodiments, the single mode core elements may have a cutoff wavelength that is less than or equal to 1300 nm. The single mode core elements may have mode field diameters in a range from greater than or equal to about 6 μm and less than or equal to about 15 μm, preferably from about 8 μm to about 12 μm. In some embodiments, the single mode core elements may have effective areas from greater than or equal to about 28 μm² and less than or equal to about 180 μm², preferably from greater than or equal to about 55 μm² and less than or equal to 120 μm².

Like the single mode core elements 104, the multimode core elements 106 are generally formed from silica-based glass and have an index of refraction $n_{1\,mm}$ and a relative refractive index $\Delta_{1\,mm}$ relative to the common outer cladding 102. In the embodiments described herein, the silica-based glass of the multimode core elements 106 is doped with one or more dopants which increases the index of refraction of the multimode core elements 106. For example, the multimode core elements 106 may comprise silica-based glass doped with germanium such as when the multimode core elements 106 comprise silica ($SiO_2$) glass up-doped with germania ($GeO_2$). However, it should be understood that dopants other than germania may be utilized in the multimode core elements, including, without limitation, $TiO_2$, $ZrO_2$, $Nb_2O_5$ and/or $Ta_2O_5$. Such dopants may be incorporated in the multimode core elements 106 either individually or in combination in order to obtain the desired index of refraction $n_{1\,mm}$ and relative refractive index $\Delta_{1\ mm}$. In some embodiments, the multimode core elements 106 may comprise from about 6.0 wt. % to about 40 wt. % $GeO_2$. For example, in some embodiments, the multimode core elements 106 comprise from about 8.0 wt. % to about 20 wt. % $GeO_2$, more preferably from about 8.0 wt. % to about 12.0 wt. % $GeO_2$, which increases the index of refraction $n_{1\ mm}$ of the multimode core elements 106 relative to undoped silica glass. In the embodiments described herein, the relative refractive index $\Delta_{1\ mm}$ of the multimode core elements 106 relative to the common outer cladding 102 is greater than or equal to about 0.2%, more preferably greater than or equal to about 0.4%. In some embodiments, the relative refractive index $\Delta_{1\ mm}$ of the multimode core elements 106 relative to the common outer cladding 102 is greater than or equal to about 0.4% and less than or equal to about 1.0%.

In the embodiments described herein, the core elements 104, 106 generally have radii r in the range from greater than or equal to about 3 µm to greater than or equal to about 35 µm such that the core elements 104, 106 can be either single-moded or multi-moded, depending on the specific application requirements. For example, the single mode core elements 104 may generally have radii r in the range from greater than or equal to about 3 µm to less than or equal to about 9 µm, more preferably from greater than or equal to about 4 µm to less than or equal to about 6 µm. In some embodiments, the single mode core elements 104 may be single-moded at wavelengths greater than or equal to about 800 nm.

The multimode core elements 106 generally have radii greater than or equal to about 5 µm, preferably greater than or equal to about 5 µm and less than or equal to about 35 µm, more preferably greater than or equal to about 8 µm and less than or equal to about 25 µm, most preferably greater than or equal to about 8 µm and less than or equal to about 15 µm. In some embodiments, the multi-mode core elements support the propagation of multiple modes at wavelengths from greater than or equal to about 800 nm to less than or equal to about 1700 nm.

Figure 4A:
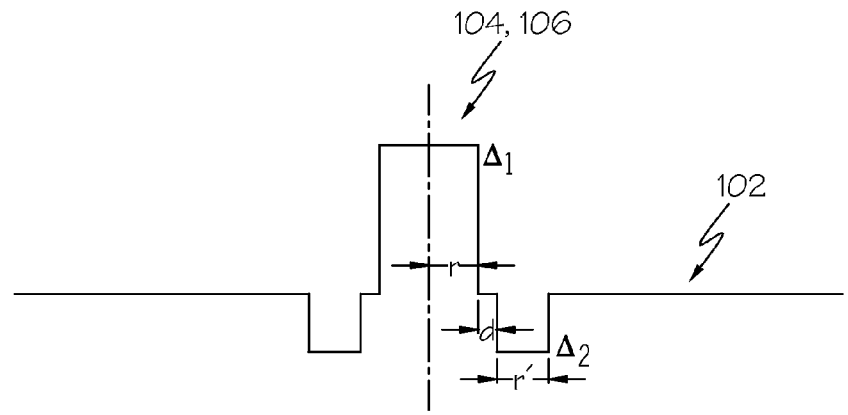
FIG. 4A graphically depicts a refractive index profile of a core element of a multi-core optical fiber having a step refractive index profile.
Figure 4B:
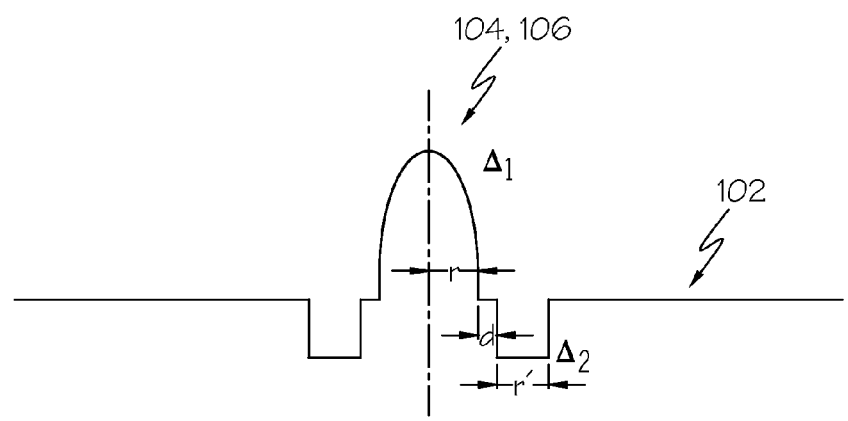
FIG. 4B graphically depicts a refractive index profile of a core element of a multi-core optical fiber having a graded or alpha-profile refractive index profile.

Referring now to FIGS. 4A and 4B, in some embodiments, the core elements 104, 106 may have a step-index profile as depicted in the refractive index profile of FIG. 4A. In other embodiments, the core elements 104, 106 may have a graded index, such as an α-profile as depicted in the refractive index profile of FIG. 4B, where an α-value defines the index of refraction of the core element as a function of the radius of the element. In embodiments where the core elements have α-profiles, the α-value of the α-profile may be in a range from about 1.9 to about 2.2 as measured at 1300 nm.

In some embodiments described herein, the single mode core elements 104 and the multimode core elements 106 may both have step refractive index profiles as depicted in FIG. 4A. In some other embodiments described herein, the single mode core elements 104 and the multimode core elements 106 may both have graded refractive index profiles as depicted in FIG. 4B. In still other embodiments, the single mode core elements 104 may have step refractive index profiles and the multimode core elements 106 may have graded refractive index profiles. In yet other embodiments, the single mode core elements 104 may have graded refractive index profiles and the multimode core elements 106 may have step refractive index profiles.

Referring now to FIGS. 1 and 4A and 4B, in some embodiments, the core elements 104, 106 further comprise a low-index annulus 108 which surrounds the core element. The low-index annulus 108 generally has an index of refraction $n_2$ and a radial width r' greater than or equal to about 1 µm and less than or equal to about 6 µm, preferably greater than or equal to about 3 µm and less than or equal to about 5 µm. The index of refraction $n_2$ of the low-index annulus 108 is such that $n_2 \leq n_{cl} \leq n_{1\ sm}$ and $n_{1\ mm}$ which yields refractive index profiles as depicted in FIGS. 4A and 4B. In some embodiments, the low-index annulus 108 may comprise silica glass down-doped with fluorine. For example, the low-index annulus 108 may comprise from about 0.36 wt. % to about 3.0 wt. % fluorine, more preferably from about 0.72 wt. % to about 2.5 wt. % fluorine, and most preferably, from about 1.4 wt. % to about 2.0 wt. % fluorine such that the relative refractive index percent $\Delta_2$ of the low-index annulus 108 relative to the common outer cladding 102 is less than the relative refractive index of the multimode core elements and the relative refractive index of the single mode core elements relative to the common outer cladding. For example, in some embodiments, the relative refractive index of the low-index annulus 108 relative to the common outer cladding is less than or equal to about −0.1%. In some embodiments, the relative refractive index percent $\Delta_2$ of the low-index annulus 108 relative to the common outer cladding may be greater than or equal to about −0.7%. For example, in some embodiments, the relative refractive index percent $\Delta_2$ of the low-index annulus 108 is greater than or equal to about −0.7% and less than or equal to about −0.1%. In some other embodiments, the relative refractive index percent $\Delta_2$ of the low-index annulus 108 is greater than or equal to about −0.5% and less than or equal to about −0.3%. In some embodiments, the low-index annulus may be positioned in direct contact with the corresponding core element. In other embodiments, the low-index annulus may be spaced apart from the corresponding core element 104, 106 by an offset spacing d. The offset spacing d may generally be in the range from greater than 0 µm to less than or equal to about 5 µm. For single mode core elements, the offset spacing d may generally be in the range from greater than or equal to about 3 µm to less than or equal to about 5 µm. For multimode core elements, the offset spacing d may generally be in the range from greater than 0 µm to less than or equal to about 2 µm. The low-index annuli 108 generally reduce the cross-talk between adjacent core elements and facilitate spacing adjacent core elements closer together than adjacent core elements which do not have low-index annuli without increasing the amount of cross-talk between the adjacent core elements. Accordingly, in some embodiments described herein, core elements with low-index annuli may be utilized to decrease the spacing between adjacent core members.

Figure 2A:
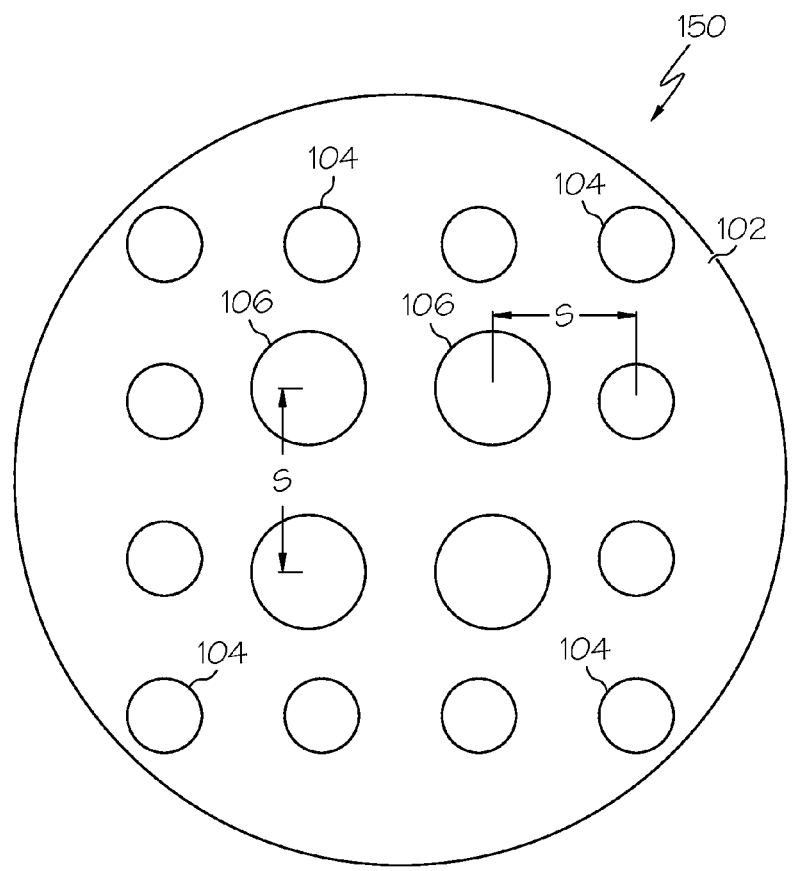
FIG. 2A schematically depicts another embodiment of a multi-core optical fiber according to one or more embodiments shown and described herein.
Figure 2B:
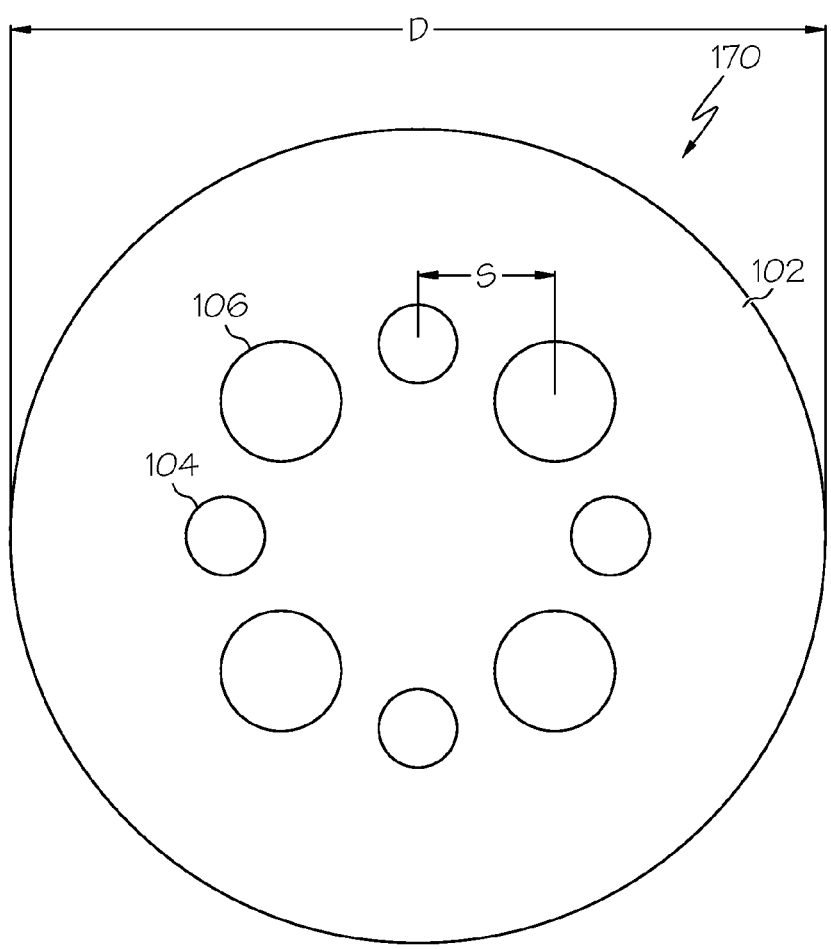
FIG. 2B schematically depicts another embodiment of a multi-core optical fiber according to one or more embodiments shown and described herein.
Figure 3:
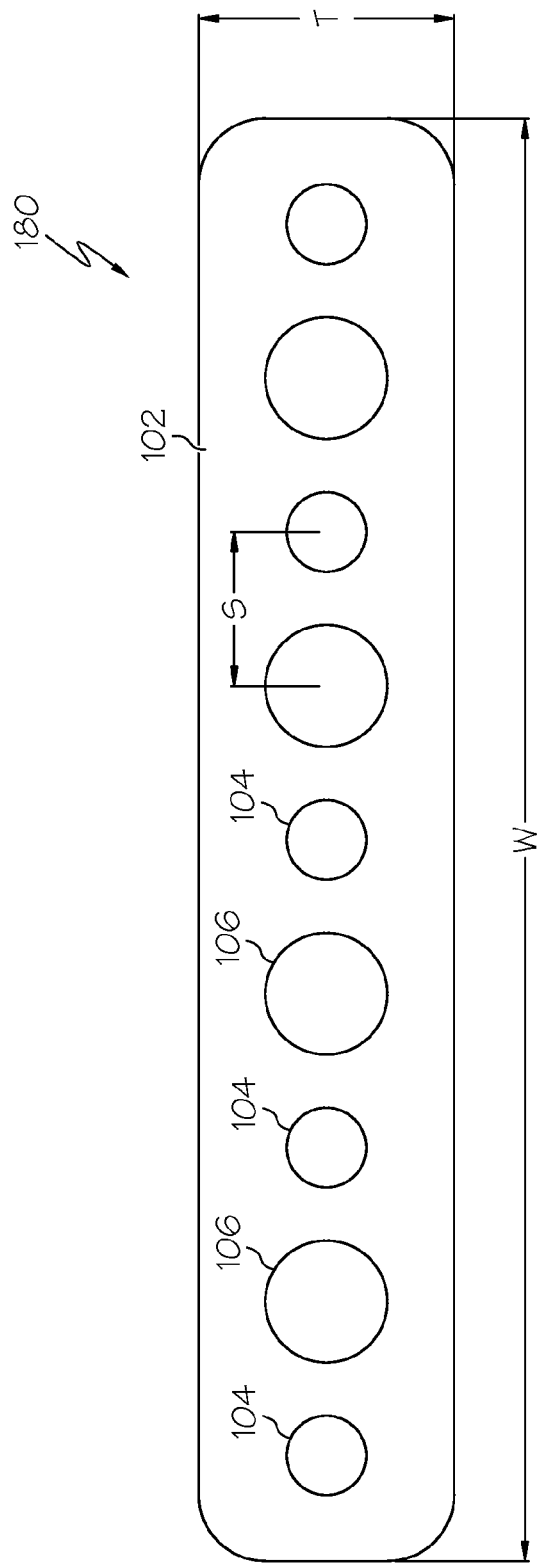
FIG. 3 schematically depicts an embodiment of a multi-core optical fiber wherein the multi-core optical fiber is a ribbon.

The multi-core optical fibers described herein may be formed in a variety of cross-sectional shapes. For example, FIGS. 1 and 2A-2B depict multi-core optical fibers 100, 150, 170 which generally have circular cross sections while FIG. 3 depicts a multi-core optical fiber 180 which has a rectangular cross section, such as when the multi-core optical fiber 180 has a ribbon configuration. However, it should be understood that other cross sectional shapes are contemplated including, without limitation, squares, ellipses, octagons and the like.

Further, in embodiments where the multi-core optical fiber has a circular cross section as shown in FIGS. 1 and 2A-2B, the multi-core optical fiber may have a diameter D less than about 400 µm, preferably less than or equal to about 300 µm to ensure fiber flexibility and bending reliability.

In embodiments where the multi-core optical fiber has a rectangular cross section, as depicted in FIG. 3, the multi-core optical fiber 180 may have a width W and a thickness T. The width W of the multi-core optical fiber 180 is dependent on the number of core elements, 104, 106 included in the multi-core optical fiber 180. However, the thickness T of the multi-core optical fiber 180 is such that the multi-core optical fiber 180 is flexible in the width W direction and may be coiled to a radius of less than or equal to about 140 mm, more preferably less than or equal to about 75 mm and, most preferably, less than or equal to about 50 mm without damaging the glass of the multi-core optical fiber. In the embodiments described herein, the thickness T of the multi-core optical fiber 180 is less than or equal to about 400 µm, more preferably less than or equal to about 200 µm, even more preferably less than or equal to about 150 µm and, most preferably, from greater than or equal to about 80 µm and less than or equal to about 150 µm.

Referring again to FIGS. 1 and 2A-2B, the plurality of single mode core elements 104 and the plurality of multimode core elements 106 may be arranged in the multi-core optical fiber in various configurations. For example, FIG. 1 schematically depicts one embodiment of a multi-core optical fiber 100 in which the plurality of single mode core elements 104 and the plurality of multimode core elements 106 are arranged in a triangular lattice configuration. FIG. 2A schematically depicts one embodiment of a multi-core optical fiber 150 in which the plurality of single mode core elements 104 and the plurality of multimode core elements 106 are arranged in a 4×4 square lattice configuration. FIG. 2B schematically depicts a multi-core optical fiber 170 in which the plurality of single mode core elements 104 and the plurality of multimode core elements 106 are arranged in a ring configuration. While FIGS. 1 and 2A-2B schematically depict specific lattice configurations for the multi-core optical fibers, it should be understood that other lattice configurations are contemplated.

The multi-core optical fibers described herein may be formed using techniques similar to those described in U.S. Patent Publication No. 2012-0114292, published May 10, 2012 and entitled "MULTI-CORE OPTICAL FIBER RIBBONS AND METHODS FOR MAKING THE SAME," the entirety of which is incorporated herein by reference. While the aforementioned patent application describes methods for making multi-core optical fiber ribbons, it should be understood that similar techniques may be utilized to produce multi-core optical fibers with different cross-sectional configurations, including, without limitation, multi-core optical fibers which are circular in cross section.

EXAMPLES

The multi-core optical fibers described herein will be further clarified by the following hypothetical examples.

Table 1 below lists six hypothetical core designs for use in a multi-core optical fiber. Example 1 is a standard single mode fiber core design. The core of Example 1 has a LP11 cutoff wavelength of 1298.8 nm such that the core is single moded at both 1310 nm and 1550 nm. The LP01 mode field diameter of the core is 9.1 µm at a wavelength of 1310 nm with a corresponding LP01 effective area of 65.3 µm². The LP01 mode field diameter of the core is 10.3 µm at a wavelength of 1550 nm with a corresponding LP01 effective area of 81.9 µm². This core has a step refractive index profile.

Core Example 2 has a higher core Δ and larger core radius relative to core Example 1 such that the core has a relatively higher LP11 cutoff wavelength which results in the propagated light being more confined to the core of the optical fiber. Accordingly, the core is single moded only in the 1550 nm window. The LP01 mode field diameter of the core is 8.9 µm at a wavelength of 1310 nm with a corresponding LP01 effective area of 64.3 µm². The LP11 effective area of the core is 101.4 µm² at 1310 nm. The LP01 mode field diameter of the core is 9.9 µm at a wavelength of 1550 nm with a corresponding LP01 effective area of 76.8 µm². Like the core of Example 1, the core of Example 2 has a step refractive index profile.

Core Example 3 is similar in design to the core of Example 1 but further includes a low-index annulus surrounding the core. The low-index annulus aids in confining the propagated light to the core and also facilitates reducing the spacing between adjacent cores in a multi-core fiber. The low-index annulus has a radial width of 4 µm and is spaced from the core by an offset spacing of 1.8 µm. The core of Example 3 has a LP11 cutoff wavelength of 1151.0 nm such that the core is single moded at both 1310 nm and 1550 nm. The LP01 mode field diameter of the core is 8.3 µm at a wavelength of 1310 nm with a corresponding LP01 effective area of 57.8 µm². The LP01 mode field diameter of the core is 9.0 µm at a wavelength of 1550 nm with a corresponding LP01 effective area of 66.0 µm². This core has a step refractive index profile.

Core Example 4 has a LP11 cutoff wavelength of 3067.3 nm and thus supports both the LP01 and LP11 modes such that the core may be used for division multiplexing applications. The core has a larger radius (12 µm) than core Examples 1-3 and has a graded or alpha profile refractive index profile with an alpha value of 2. The LP01 mode field diameter of the core is 11.8 µm at a wavelength of 1310 nm with a corresponding LP01 effective area of 108.7 µm². The LP11 effective area of the core is 146.9 µm² at 1310 nm. The LP01 mode field diameter of the core is 12.8 mm at a wavelength of 1550 nm with a corresponding LP01 effective area of 129.2 µm². The LP11 effective area of the core is 176.6 µm at 1550 nm.

Core Example 5 is a multimode core which supports transmissions at wavelengths of 850 nm. The core of Example 5 has a radius of 25 µm and is formed with an alpha refractive index profile having an alpha value of 2.12

Core Example 6 is a multimode core which further includes a low-index annulus surrounding the core. The low-index annulus has a radial width of 5 µm and is spaced apart from the core by an offset spacing of 1.4 µm. The presence of the low-index annulus decreases the bend losses associated with the core.

TABLE 1

Core design examples

| | Example | | | | | |
|---|---|---|---|---|---|---|
| | 1 | 2 | 3 | 4 | 5 | 6 |
| Core Δ (%) | 0.34 | 0.4 | 0.34 | 0.5 | 1 | 0.94 |
| Core radius (µm) | 4.2 | 4.5 | 4.2 | 12 | 25 | 24.5 |
| Core α | 2000 | 2000 | 2000 | 2 | 2.12 | 2.10 |
| Offset Spacing d (µm) | na | na | 1.8 | na | Na | 1.4 |
| $\Delta_2$(%) | na | na | −0.4 | na | Na | −0.45 |
| Radial width of low-index annulus (µm) | na | na | 4 | na | Na | 5 |
| LP11 cutoff wavelength (nm) | 1298.8 | 1507.7 | 1151.0 | 3067.3 | >5000 | >5000 |
| LP01 mode field diameter at 1310 nm (nm) | 9.1 | 8.9 | 8.3 | 11.8 | | |
| LP01 effective area at 1310 nm (mm²) | 65.3 | 64.3 | 57.8 | 108.7 | | |
| LP11 effective area at 1310 nm (mm²) | na | 101.4 | na | 146.9 | | |

TABLE 1-continued

Core design examples

| | Example | | | | | |
|---|---|---|---|---|---|---|
| | 1 | 2 | 3 | 4 | 5 | 6 |
| LP01 mode field diameter at 1550 nm (nm) | 10.3 | 9.9 | 9.0 | 12.8 | | |
| LP01 effective area at 1550 nm (mm$^2$) | 81.9 | 76.8 | 66.0 | 129.2 | | |
| LP11 effective area at 1550 nm (mm$^2$) | na | na | na | 176.6 | | |

Table 2 contains several hypothetical multi-core fiber designs which contain a plurality of single mode core elements as well as a plurality of multi-mode core elements. The multi-core fibers in each of Examples A-G contain multiple cores selected from Examples 1-6 of Table 1. The fibers of Examples A and B are circular in cross section with the single mode cores and the multimode cores arranged as depicted in FIG. 1. The fiber of Example C is circular in cross section with the single mode cores and the multimode cores arranged as depicted in FIG. 2A. The fibers of Examples D and E are circular in cross section with the single mode cores and the multimode cores arranged as depicted in FIG. 2B. Finally, the fibers of Examples E and F are rectangular in cross section with the single mode cores and the multimode cores arranged as depicted in FIG. 3.

TABLE 2

Multi-core fiber design examples

| Example | Cores Arranged as in: | Total # of cores | # of single mode cores | # of multi mode cores | Single Mode Core design | Multimode core design | Core spacing S (μm) | Fiber dimensions (μm) |
|---|---|---|---|---|---|---|---|---|
| A | FIG. 1 | 14 | 12 | 2 | Ex. 1 | Ex. 4 | 50 | D = 285 |
| B | FIG. 1 | 14 | 12 | 2 | Ex. 2 | Ex. 4 | 45 | D = 250 |
| C | FIG. 2A | 16 | 12 | 4 | Ex. 3 | Ex. 4 | 35 | D = 200 |
| D | FIG. 2B | 8 | 4 | 4 | Ex. 1 | Ex. 4 | 40 | D = 150 |
| E | FIG. 2B | 8 | 4 | 4 | Ex. 1 | Ex. 5 | 50 | D = 200 |
| F | FIG. 3 | 10 | 5 | 5 | Ex. 2 | Ex. 4 | 37 | W = 400, T = 125 |
| G | FIG. 3 | 20 | 10 | 10 | Ex. 3 | Ex. 6 | 45 | W = 900, T = 125 |

It should now be understood that the multi-core optical fibers disclosed herein include a plurality of single mode cores and a plurality of multimode cores disposed in a common outer cladding. The use of multiple cores with different designs (i.e., multimode or single mode) facilitates supporting different types of transmission systems, such as single mode, multimode or mode division multiplexing, in a single optical fiber, thereby decreasing the number of individual fibers in a particular system as well as the size of the corresponding optical fiber interconnects. Further, incorporation of multiple core elements in a common outer cladding decreases the overall number of individual fibers in a given system.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A multi-core optical fiber comprising:
   a common outer cladding formed from silica-based glass and having a cladding index of refraction $n_{cl}$;
   a plurality of single mode core elements formed from silica-based glass and disposed in the common outer cladding, the plurality of single mode core elements having a maximum index of refraction $n_{1\ sm}$; and
   a plurality of multimode core elements formed from silica-based glass and disposed in the common outer cladding, the plurality of multimode core elements having a maximum index of refraction $n_{1\ mm}$, wherein:
   $n_{1\ sm}$ is greater than $n_{cl}$;
   $n_{1\ mm}$ is greater than $n_{cl}$;
   individual ones of the plurality of single mode core elements comprise a low-index annulus formed from silica-based glass surrounding the core element, the low-index annulus having a radial width greater than or equal to 1 μm and less than or equal to 6 μm; and
   a center-to-center spacing between adjacent core elements is greater than or equal to 25 μm.

2. The multi-core optical fiber of claim 1, wherein a relative refractive index $\Delta_{1\ mm}$ of individual ones of the plurality of multimode core elements relative to the common outer cladding is greater than or equal to 0.2%.

3. The multi-core optical fiber of claim 1, wherein a relative refractive index $\Delta_{1\ sm}$ of individual ones of the plurality of single mode core elements relative to the common outer cladding is greater than or equal to 0.2%.

4. The multi-core optical fiber of claim 1, wherein a relative refractive index $\Delta_2$ of the low-index annulus to the common outer cladding is less than or equal to −0.1%.

5. The multi-core optical fiber of claim 1, wherein the low-index annulus is spaced apart from the core element by an offset spacing which is greater than or equal to 3 μm and less than or equal to 5 μm.

6. The multi-core optical fiber of claim 1, wherein a cross talk between adjacent core elements is less than −30 dB.

7. A multi-core optical fiber comprising:
   a common outer cladding formed from silica-based glass;
   a plurality of single mode core elements formed from silica-based glass and disposed in the common outer cladding, individual ones of the plurality of single mode core elements having a relative refractive index $\Delta_{1\ sm}$ greater than or equal to 0.2% relative to the common outer cladding; and a plurality of multimode core elements formed from silica-based glass and disposed in the common outer cladding, individual ones of the plurality of multimode core elements having a relative refractive index $\Delta_{1\ mm}$ greater than or equal to 0.2% relative to the common outer cladding, wherein a center-to-center spacing between adjacent core elements is greater than or equal to 25 μm, wherein individual ones of the plurality of single mode core elements, individual ones of the plurality of multimode core elements, or individual ones of both the plurality of single mode core elements and the plurality of multimode core elements comprise a low-index annulus formed from silica-based glass surrounding the core element, the low index annulus being spaced apart from the core element by an offset spacing which is less than or equal to 2 μm or greater than or equal to 3 μm and less than or equal to 5 μm.

8. The multi-core optical fiber of claim 7, wherein a relative refractive index $\Delta_2$ of the low-index annulus to the common outer cladding is less than the relative refractive index $\Delta_{1\ mm}$ and the relative refractive index $\Delta_{1\ sm}$.

9. The multi-core optical fiber of claim 7, wherein individual ones of the plurality of single mode core elements have core radii greater than or equal to about 3 μm and less than or equal to about 10 μm.

10. The multi-core optical fiber of claim 7, wherein individual ones of the plurality of multimode core elements have core radii greater than or equal to about 5 μm and less than or equal to about 35 μm.

11. The multi-core optical fiber of claim 7, wherein the relative refractive index $\Delta_{1\ sm}$ is greater than or equal to about 0.2% and less than or equal to about 0.5%.

12. The multi-core optical fiber of claim 7, wherein the relative refractive index $\Delta_{1\ mm}$ is greater than or equal to 0.4% and less than or equal to 1.0%.

13. The multi-core optical fiber of claim 7, wherein the low-index annulus has a relative refractive index $\Delta_2$ of less than or equal to –0.1% relative to the common outer cladding and a radial width greater than or equal to 1 μm and less than or equal to 6 μm.

14. The multi-core optical fiber of claim 7, wherein individual ones of the plurality of single mode core elements comprise the low-index annulus and the offset spacing is greater than or equal to 3 μm and less than or equal to 5 μm.

15. The multi-core optical fiber of claim 7, wherein individual ones of the plurality of multimode core elements comprise the low-index annulus and the offset spacing is less than or equal to 2 μm.

16. A multi-core optical fiber comprising:
   a common outer cladding formed from silica-based glass and having a cladding index of refraction $n_{c1}$;
   a plurality of single mode core elements formed from silica-based glass and disposed in the common outer cladding, the plurality of single mode core elements having a maximum index of refraction $n_{1\ sm}$; and
   a plurality of multimode core elements formed from silica-based glass and disposed in the common outer cladding, the plurality of multimode core elements having a maximum index of refraction $n_{1\ mm}$, wherein:
   $n_{1\ sm}$ is greater than $n_{c1}$;
   $n_{1\ mm}$ is greater than $n_{c1}$;
   individual ones of the plurality of multi-mode core elements comprise a low-index annulus formed from silica-based glass surrounding the core element, the low-index annulus having a radial width greater than or equal to 1 μm and less than or equal to 6 μm; and
   a center-to-center spacing between adjacent core elements is greater than or equal to 25 μm.

17. The multi-core optical fiber of claim 16, wherein the low-index annulus is spaced apart from the core element by an offset spacing which is less than or equal to 2 μm.

18. The multi-core optical fiber of claim 16, wherein a relative refractive index $\Delta_2$ of the low-index annulus to the common outer cladding is less than or equal to –0.1%.

19. The multi-core optical fiber of claim 16, wherein a relative refractive index $\Delta_{1\ mm}$ of individual ones of the plurality of multimode core elements relative to the common outer cladding is greater than or equal to 0.2%.

20. The multi-core optical fiber of claim 16, wherein a relative refractive index $\Delta_{1\ sm}$ of individual ones of the plurality of single mode core elements relative to the common outer cladding is greater than or equal to 0.2%.

* * * * *